US009482240B2

(12) United States Patent
Gerard et al.

(10) Patent No.: US 9,482,240 B2
(45) Date of Patent: Nov. 1, 2016

(54) COMPRESSOR HOUSING ASSEMBLY FOR A TURBOCHARGER

(71) Applicant: Honeywell International Inc., Morristown, NJ (US)

(72) Inventors: Arnaud Gerard, Epinal (FR); Vincent Eumont, Thaon les Vosges (FR); Baptiste Van Haesebroeck, Chaumousey (FR); Francis Abel, La Baffe (FR); Quentin Roberts, Nancy (FR)

(73) Assignee: Honeywell International Inc., Morris Plains, NJ (US)

( * ) Notice: Subject to any disclaimer, the term of this patent is extended or adjusted under 35 U.S.C. 154(b) by 490 days.

(21) Appl. No.: 13/956,132

(22) Filed: Jul. 31, 2013

(65) Prior Publication Data

US 2015/0037141 A1 Feb. 5, 2015

(51) Int. Cl.
| F04D 29/42 | (2006.01) |
|---|---|
| F04D 1/00 | (2006.01) |
| F04D 29/62 | (2006.01) |
| F04D 25/02 | (2006.01) |
| F02C 7/045 | (2006.01) |
| F04D 29/68 | (2006.01) |

(52) U.S. Cl.
CPC .......... *F04D 29/4206* (2013.01); *F02C 7/045* (2013.01); *F04D 1/00* (2013.01); *F04D 25/024* (2013.01); *F04D 29/4213* (2013.01); *F04D 29/624* (2013.01); *F04D 29/685* (2013.01); *F05D 2220/40* (2013.01); *F05D 2230/60* (2013.01); *F05D 2270/101* (2013.01); *Y10T 29/49236* (2015.01)

(58) Field of Classification Search
CPC ............. F04D 25/024; F04D 29/4206; F04D 29/4213; F04D 29/624; F04D 29/685
See application file for complete search history.

(56) References Cited

U.S. PATENT DOCUMENTS

| 5,246,335 A | 9/1993 | Mitsubori |
| 5,333,990 A * | 8/1994 | Foerster .............. F04D 29/4213 |
| | | 415/58.4 |
| 5,399,064 A | 3/1995 | Church |

(Continued)

FOREIGN PATENT DOCUMENTS

| EP | 1557568 A2 | 7/2005 |
| EP | 2535595 A1 | 12/2012 |

(Continued)

OTHER PUBLICATIONS

Extended European Search Report—Application No. 14177567.6-1607, Dec. 18, 2014 (7 pages).

*Primary Examiner* — Nathaniel Wiehe
*Assistant Examiner* — Woody Lee, Jr.
(74) *Attorney, Agent, or Firm* — Brian J. Pangrle

(57) ABSTRACT

A compressor housing assembly for a turbocharger can include a compressor housing shell that includes an axis for alignment with a rotational axis of a compressor wheel, a wall that includes features defined in part by radii with respect to the axis, and an edge that defines in part an inlet opening of a shroud port; and an insert that includes a shroud section and a noise suppressor section that define a recirculation port where the insert is axially located by the wall of the compressor housing shell, where an internal recirculation passage is defined in part by the insert and the wall, and where an edge of the shroud section (e.g., a lowermost edge) defines in part the inlet opening of the shroud port.

10 Claims, 10 Drawing Sheets

(56) References Cited

U.S. PATENT DOCUMENTS

| | | | |
|---|---|---|---|
| 8,272,832 B2 * | 9/2012 | Yin | F04D 29/444 |
| | | | 415/191 |
| 2005/0163606 A1 | 7/2005 | Svihla et al. | |
| 2007/0271921 A1 | 11/2007 | Chen | |
| 2008/0247870 A1 | 10/2008 | Sirakov | |
| 2011/0085902 A1 * | 4/2011 | Yin | F04D 29/4213 |
| | | | 415/208.2 |
| 2012/0308371 A1 | 12/2012 | Zheng et al. | |
| 2015/0159664 A1 * | 6/2015 | Olin | F02C 7/045 |
| | | | 415/58.2 |

FOREIGN PATENT DOCUMENTS

| | | |
|---|---|---|
| GB | 2256460 A | 12/1992 |
| JP | 2000-064848 A | 2/2000 |

\* cited by examiner

COMPRESSOR HOUSING ASSEMBLY FOR A TURBOCHARGER

TECHNICAL FIELD

Subject matter disclosed herein relates generally to compressor housing assemblies for turbochargers for internal combustion engines.

BACKGROUND

Turbochargers are frequently utilized to increase performance of an internal combustion engine. A turbocharger can extract energy from an engine's exhaust via a turbine to drive a compressor that compresses intake air directed to the engine. Turbochargers typically rely on a radial or centrifugal compressor wheel or wheels. In general, intake air is received at an inducer portion of a compressor wheel and discharged radially at an exducer portion. The discharged air is then directed to a volute, usually via a diffuser section.

A compressor may be characterized by a compressor flow map. A compressor flow map (e.g., a plot of pressure ratio versus mass air flow) can help characterize performance of a compressor. In a flow map, pressure ratio is typically defined as the air pressure at the compressor outlet divided by the air pressure at the compressor inlet. Mass air flow may be converted to a volumetric air flow through knowledge of air density or air pressure and air temperature.

Various operational characteristics define a compressor flow map. One operational characteristic of a compressor is commonly referred to as a surge limit, while another operational characteristic is commonly referred to as a choke area. A map may be considered as presenting an operating envelope between a choke area or line and a surge area or line.

Choke area may result from limitations associated with the flow capacity of the compressor stage. In general, compressor efficiency falls rapidly as the local Mach number in the gas passage approaches unity. Thus, a choke area limit typically approximates a maximum mass air flow.

A surge limit may represent a minimum mass air flow that can be maintained at a given compressor wheel rotational speed. Compressor operation may be unstable in this area, for example, fluctuations in pressure and flow reversal can may occur in such an operational area.

In general, compressor surge stems from flow instabilities that may be initiated by aerodynamic stall or flow separation in one or more compressor components (e.g., as a result of exceeding a limiting flow incidence angle to compressor blades or exceeding a limiting flow passage loading).

For a turbocharged engine, compressor surge may occur when the engine is operating at high load or torque and low engine speed, or when the engine is operating at a low engine speed with a high rate of exhaust gas recirculation (e.g., EGR). Compressor surge may also occur when a relatively high specific torque output is required of an engine with a variable nozzle turbine (VNT) or an electrically assisted turbocharger. Additionally, surge may occur when a rapid intake air boost is initiated using an electric motor or VNT mechanism, or when an engine is suddenly decelerated (e.g., consider a closed throttle valve while shifting gears).

Various technologies described herein pertain to compressor assemblies where, for example, one or more components may optionally provide for surge reduction.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
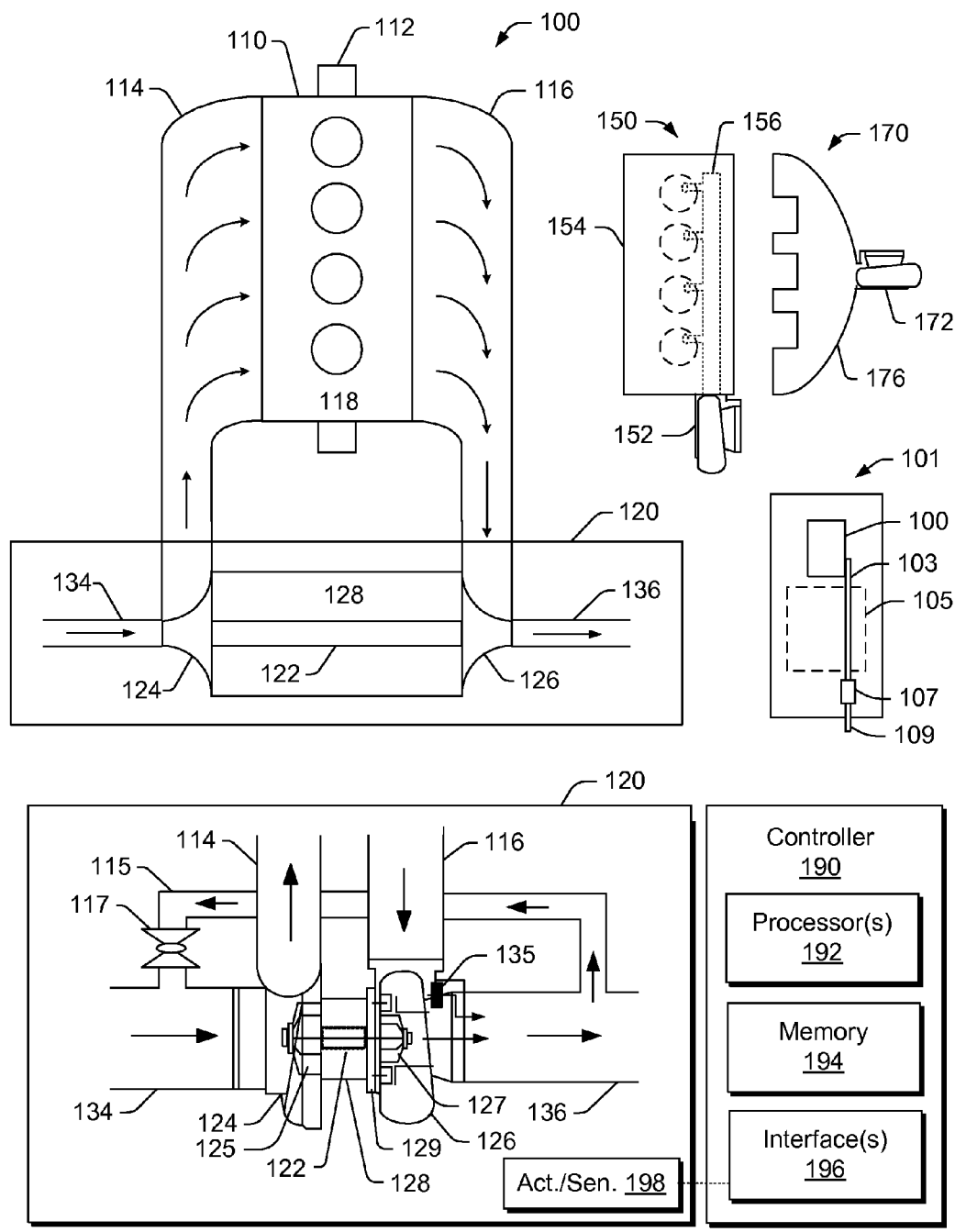
FIG. 1 is a diagram of an example of a turbocharger, an example of an internal combustion engine, an example of a vehicle, examples of housing arrangements and an example of a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135, the variable geometry assembly 129, etc. may be controlled by a controller that includes an actuator responsive to an electrical signal, a pressure signal, etc.

Figure 2:
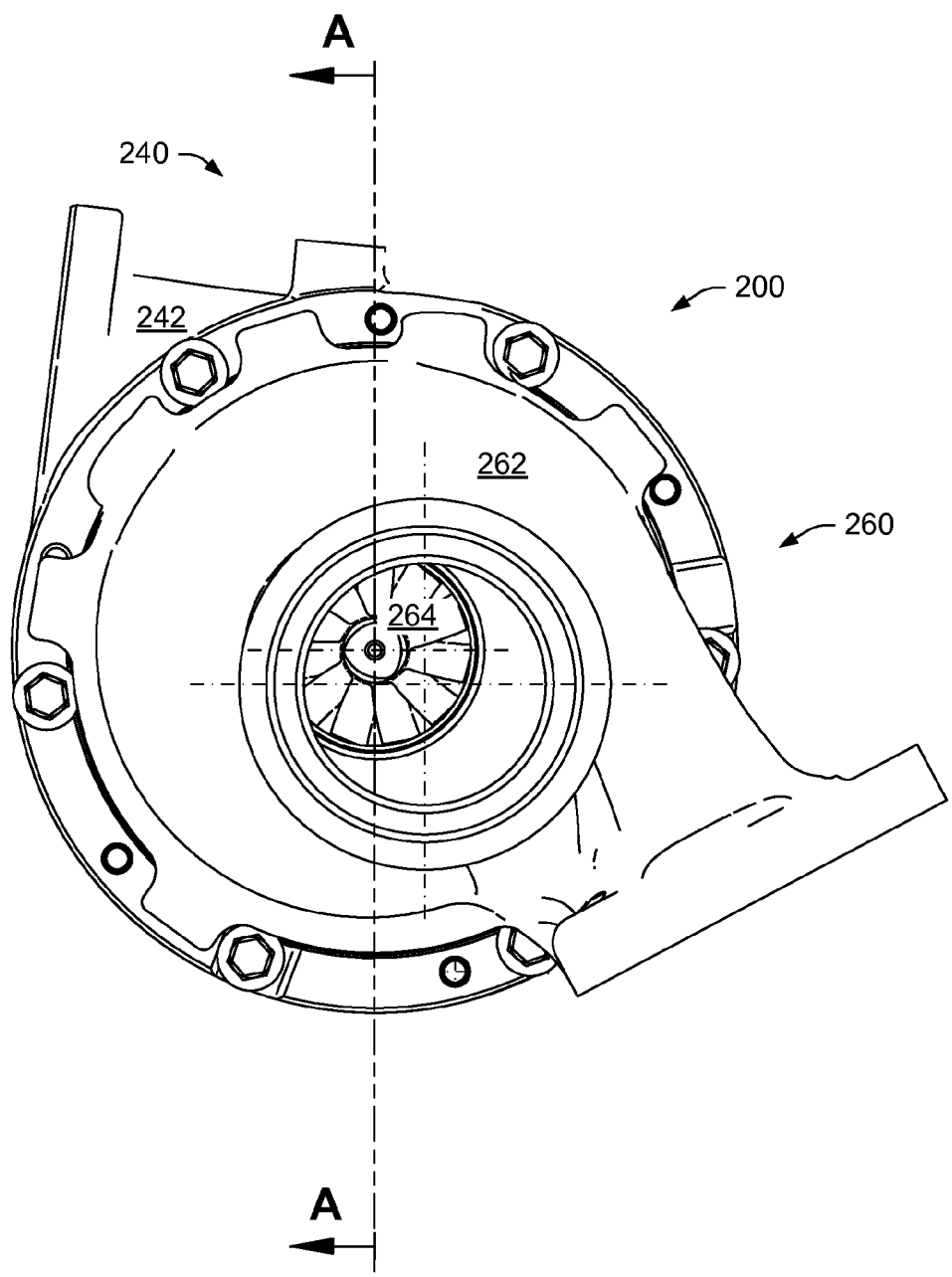
FIG. 2 is a perspective view of an example of an assembly.

FIG. 2 shows a perspective view of an example of a turbocharger assembly 200 that includes a compressor assembly 240 and a turbine assembly 260, for example, with a center housing disposed therebetween. In the example of FIG. 2, the compressor assembly 240 includes a compressor housing shell 242 with a wall that forms an inlet opening and a wall that forms a flange with an outlet opening. The compressor housing shell 242 defines, in part, a compressor wheel space for a compressor wheel (e.g., an impeller). In the example of FIG. 2, the turbine assembly 260 includes a turbine housing shell 262 with a wall that forms an outlet opening and a wall that forms a flange with an inlet opening. The turbine housing shell 262 defines, in part, a turbine wheel space for a turbine wheel (e.g., an impeller).

Figure 3:
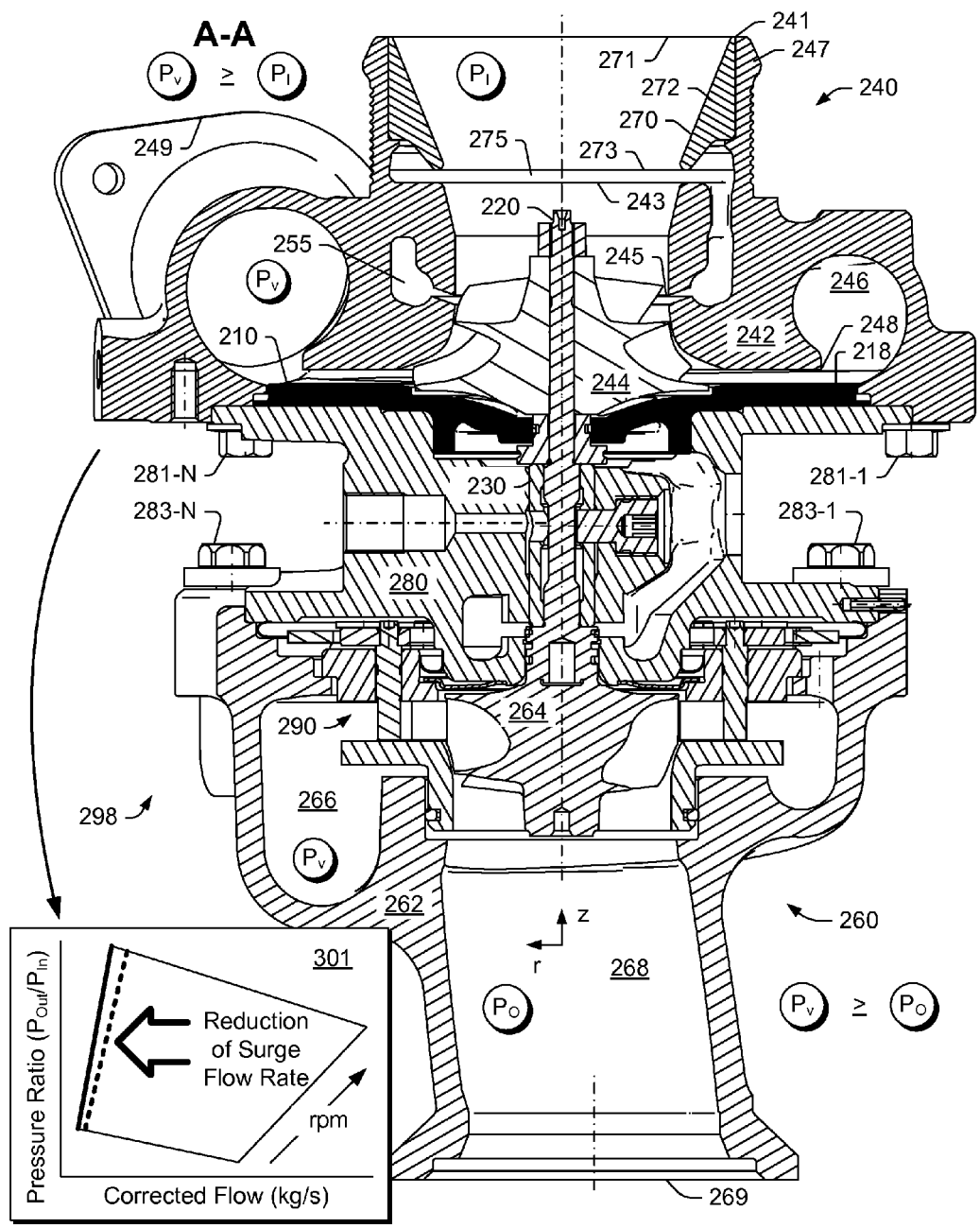
FIG. 3 is a cut-away view of the assembly of FIG. 2 along a line A-A and an example of a simplified compressor map.

FIG. 3 shows a cut-away view of the turbocharger assembly 200 of FIG. 2 along a line A-A (see, e.g., line A-A in FIG. 2). As shown, the turbocharger assembly 200 includes a shaft 220 supported by a bearing 230 (e.g., a journal bearing, a bearing assembly such as a rolling element bearing with an outer race, etc.) disposed in a bore (e.g., a through bore defined by one or more bore walls) of a housing 280 between the compressor assembly 240 and the turbine assembly 260. The compressor assembly 240 includes the compressor housing shell 242 that defines a volute 246 and that houses a compressor wheel 244, for example, in a space defined by the compressor housing shell 242 and a backplate 210. As shown in the example of FIG. 3, the backplate 210 is disposed between the compressor housing shell 242 and a compressor side of the housing 280. As an example, the backplate 210 may be secured by a clamping mechanism such as, for example, bolts 281-1 to 281-N that bolt the compressor housing shell 242 to the housing 280.

In the example of FIG. 3, the turbine assembly 260 includes the turbine housing shell 262 that defines a volute 266 and that defines, in part, a turbine wheel space for the turbine wheel 264. The turbine wheel 264 may be, for example, welded or otherwise attached to the shaft 220 to form a shaft and wheel assembly ("SWA") where a free end of the shaft 220 allows for attachment of the compressor wheel 244 (e.g., either via a partial bore, a through bore, etc.).

The turbine assembly 260 further includes a variable geometry assembly 290, which may be referred to as a "cartridge", that is positioned between the housing 280 and the turbine housing shell 262. A clamping mechanism may be provided, for example, consider bolts 283-1 to 283-N that bolt the turbine housing shell 262 to a turbine side of the housing 280. As an example, the variable geometry assembly 290 may include vanes that define nozzles therebetween where, for example, pivotable adjustment of the vanes may shape the nozzles.

As to exhaust flow, higher pressure exhaust in the volute 266 passes through passages (e.g., a nozzle or nozzles) of the cartridge 250 to reach the turbine wheel 264 as disposed in the turbine wheel space defined in part by the cartridge 250 and the turbine housing shell 262. After passing through the turbine wheel space, exhaust travels axially outwardly along a passage 268 defined by a wall of the turbine housing shell 262 that also defines an opening 269 (e.g., an exhaust outlet). As indicated, during operation of the turbocharger 200, exhaust pressure in the volute 266 ($P_V$) is greater than the exhaust pressure in the passage 268 ($P_O$).

In the example of FIG. 3, inlet and volute pressures ($P_I$, $P_V$) are shown for the compressor assembly 240. As shown in FIG. 3, the compressor housing shell 242 includes a wall 247 (e.g., a cylindrical wall, etc.) that forms the inlet opening 241. The wall 247 also forms a seat for an insert 270. For example, the wall 247 may include an annular shoulder that extends inwardly to form an axial face upon which the insert 270 may be seated.

In the example, of FIG. 3, the insert 270 includes a wall 272 that extends between an upper edge 271 that forms an upper opening and a lower edge 273 that forms, in part, a recirculation port 275. The recirculation port 275 is in fluid communication with a shroud port 245 via an internal passage 255 (e.g., a cavity) defined by the compressor housing shell 242. In such an example, intake air may flow into the shroud port 245 to the internal passage 255 and out of the recirculation port 275 (e.g., forming a recirculation loop for intake air). In such an example, where EGR is employed, the intake air may include exhaust (see, e.g., the EGR conduit 115 in FIG. 1).

The compressor assembly 240 of FIG. 3 further includes a diffuser section defined in part by a surface 248 of the compressor housing shell 242 and in part by a surface 218 of the backplate 210. The diffuser section is disposed between the compressor wheel space and the volute 246 and may "diffuse" turbulence, etc. imparted by blades of the compressor wheel 244 during operation. For example, as the diffuser section may be substantially annular, cross-sectional flow area increases from a shroud end to a volute end of the diffuser section, which can act to decrease radial velocity of intake air compressed via rotation of the compressor wheel 244 in the compressor assembly 240.

As an example, a so-called ported shroud formed by a shroud port and a recirculation port of a compressor assembly may be beneficial for reduction of surge. For example, FIG. 3 also shows an example of a compressor map 301, which includes surge lines. As the surge line moves to the left, a compressor may operate at lower corrected flow for a given pressure ratio, for example, with reduced risk of surge.

As mentioned, a surge limit can represent a minimum mass air flow that can be maintained at a given compressor wheel rotational speed. Compressor operation may be unstable at or near a surge limit, for example, as fluctuations in pressure and flow reversal may occur. Compressor surge may stem from flow instabilities that may be initiated by aerodynamic stall or flow separation in one or more compressor components (e.g., as a result of exceeding a limiting flow incidence angle to compressor blades or exceeding a limiting flow passage loading).

For a turbocharged engine, compressor surge may occur when the engine is operating at high load or torque and low engine speed, or when the engine is operating at a low engine speed with a high rate of exhaust gas recirculation (e.g., EGR). Compressor surge may also occur when a relatively high specific torque output is required of an engine with a variable nozzle turbine (VNT, see also the variable geometry assembly 129 of FIG. 1 and the cartridge 250 of FIG. 3) or an electrically assisted turbocharger. Additionally, surge may occur when a rapid intake air boost is initiated using an electric motor or VNT mechanism, or when an engine is suddenly decelerated (e.g., consider a closed throttle valve while shifting gears).

A ported shroud may enlarge a compressor map in a low flow region, for example, to reduce risk of surge. For example, recirculation may act to effectively increase flow to a compressor wheel in a compressor wheel space of a compressor assembly. Further, as an example, a "widened" compressor map (e.g., as achieved by a ported shroud) may facilitate compliance with one or more emission standards.

A ported shroud, however, may increase noise, for example, as intake air flows into a shroud port to an internal passage and then out of a recirculation port. Such noise may be addressed, in part, by providing smooth surfaces (e.g., deburred, polished, etc.). However, where the shroud port, internal passage and recirculation port depend on surfaces (e.g., including edges) of a compressor housing shell, some of these surfaces may be difficult to control, deburr, etc. For example, where a compressor housing shell is sand cast as a single unitary component, inspection for surface quality of an internal passage may be prohibitive (e.g., by cost, time, space constraints, etc.). Further, even if such inspection is not prohibitive, addressing any surface "imperfections" may be prohibitive. For example, a shroud port (e.g., formed in part by machining a slot into a shroud of a cast shell) may be only a few millimeters in axial height and several millimeters deep. Further, as indicated in FIG. 3, an upper portion of the compressor housing shell 242 is supported by one or more arms (see, e.g., left side above shroud port 245). If an imperfection exists axially underneath one of such arms, it may be difficult to remedy. Hence, various factors associated with a ported shroud that is formed into a shroud portion of a cast compressor housing shell may increase cost, time, deburring rate, scrap rate, etc.

As to noise reduction, another approach may include a separate component that is inserted into a compressor housing shell, for example, to shape flow, direct acoustic energy, etc. For example, the assembly 200 of FIGS. 2 and 3 includes the insert 270 as a noise suppressor. As mentioned, the wall 247 of the compressor housing shell 242 can include a shoulder to support the insert 270. In such an example, the recirculation path includes only a small portion of its entire surface area formed by the insert 270. Specifically, only an outer surface of the wall 272 that extends axially downwardly and radially inwardly from the shoulder of the wall 247 to the lower edge 273 forms a portion of the recirculation path (e.g., an annular portion). In other words, the majority of the recirculation path is formed by surfaces of the compressor housing shell 242.

Figure 4:
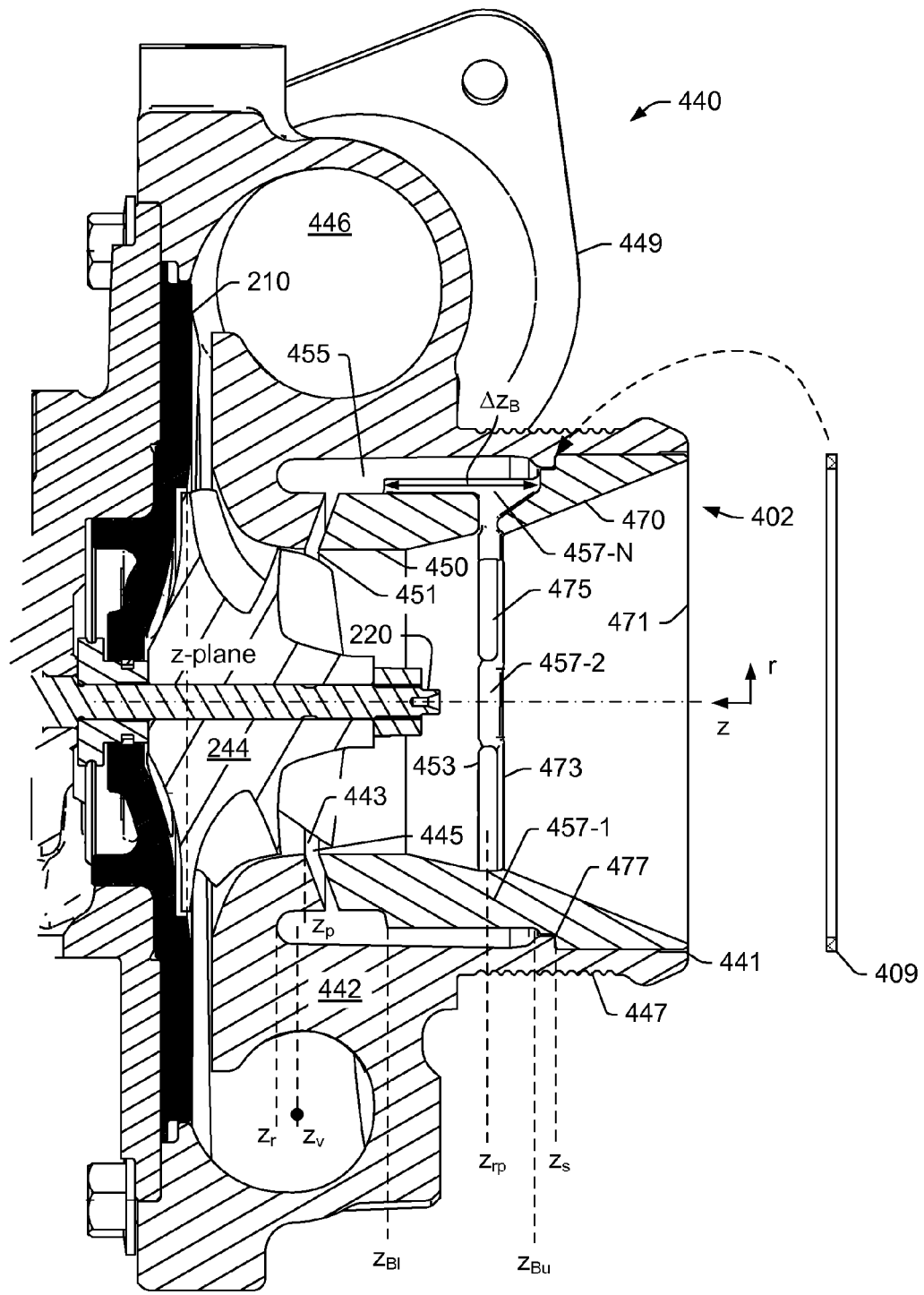
FIG. 4 is a diagram of an example of an assembly that includes an insert that forms, in part, a shroud port.

FIG. 4 shows an example, of a compressor housing assembly 440 that includes a compressor housing shell 442 with an insert 402 that includes a shroud section 450 and a noise suppressor section 470. In the example of FIG. 4, the compressor housing shell 442 is shown as being a unitary component, for example, cast as a single piece. As an example, a multiple piece compressor housing shell may be configured to receive an insert such as the insert 402 (e.g., noting that, in general, a unitary shell may provide efficiencies as to cost, assembly, etc.). In the example of FIG. 4, the insert 402 may be a single, unitary component, for example, formed of metal, alloy or other suitable material (e.g., a polymer, a fiber material, a composite material, etc.).

As shown in FIG. 4, the insert 402 is received via an opening 441 defined by an end of a cylindrical wall 447 of the compressor housing shell 442. As an example, the insert 402 may be positioned axially to extend above the end of the wall 447, to extend below the end of the wall 447 or to extend approximately to the end of the wall 447. As an example, the wall 447 may be defined as extending from the end that defines the opening 441 (e.g., an upper end) to, for example, a bottom of a recess (e.g., a lower end, see, e.g., an axial dimension $z_r$ in FIG. 4). Such a wall may include various features that may be defined, for example, with respect to a cylindrical coordinate system (e.g., r, z and Θ).

In the example of FIG. 4, the wall 447 includes an annular outer lip, for example, to facilitate mounting of a conduit to the compressor housing shell 442. As an example, ridges, threads, etc. may be provided on an outer surface of the wall 447 to facilitate mounting of a conduit. As shown in FIG. 4, the compressor housing shell 442 also includes a flange with an outlet opening 449. Between the opening 441 and the opening 449, the compressor housing shell 442 includes a volute 446, for example, defined by a scroll wall (e.g., of increasing cross-sectional area toward the outlet opening 449). A diffuser section may be formed by the compressor housing shell 442 and a backplate 210 where the diffuser section extends from a compressor wheel space (e.g., just beyond an outer diameter of a compressor wheel 244) to the volute 446. In the example of FIG. 4, the compressor housing assembly 440 is configured to include a through flow path and a recirculation flow path.

As shown in the example of FIG. 4, the shroud section 450 of the insert 402 includes a lower edge 451 that forms a shroud port 445 with an upper edge 443 of the compressor housing shell 442 and the shroud section 450 includes an upper edge 453 that may form, in part, one or more recirculation openings of a recirculation port 475 (e.g., for a recirculation flow path). In the example of FIG. 4, the lowest edge of the insert 402 (e.g., along the z-axis) is the lower edge 451 of the shroud section 450.

As to the noise suppressor section 470 of the insert 402, in the example of FIG. 4, it includes an upper edge 471 that forms an upper opening of the insert 402 and it also includes a lower edge 473 that forms, in part, the one or more recirculation openings of the recirculation port 475 (e.g., in conjunction with, in part, the upper edge 453 of the shroud section 450 of the insert 402).

In the example of FIG. 4, the shroud section 450 and the noise suppressor section 470 of the insert 402 are joined via one or more bridges 457-1, 457-2, 457-N. For example, in the cut-away view of FIG. 4, the bridge 457-1 is shown in cross-section as bridging the shroud section 450 and the noise suppressor section 470; whereas, the bridges 457-2 and 457-N are shown as being oriented at other angles about the z-axis and as bridging the shroud section 450 and the noise suppressor section 470. A bridge may include a bridge length ($\Delta z_B$), for example, defined between a lower end that extends into an internal passage 455 (e.g. cavity) and an upper end (e.g., that may be at or proximate to the shoulder 477). Between the bridges, respective openings may exist, for example, as defined by a side of one bridge, a side of another bridge, the upper edge 453 of the shroud section 450 of the insert 402 and the lower edge 473 of the noise suppressor section 470 of the insert 402. As an example, where an insert includes four bridges, it may include four openings (e.g., recirculation port openings).

As shown in the example of FIG. 4, the internal passage 455 is defined in part by the compressor housing shell 442 and in part by the insert 402. As an example, the compressor housing shell 442 may include a substantially cylindrical recess that extends axially to a depth ($z_r$) from the opening 441 beyond a mid-point of a cross-section of a volute 446 ($z_v$) of the compressor assembly 400, for example, where the recess depth ($z_r$) as measured from the opening 441 is greater than a depth ($z_p$) of the shroud port 445. In such an example, at the particular cross-section shown in FIG. 4, the recess is disposed at least in part between a compressor wheel space and the volute 446 of the compressor housing shell 442. As shown in the example of FIG. 4, the recess may be rounded at its bottom, for example, for purposes of reducing friction losses, etc. of intake air that passes to the internal passage 455 via the shroud port 445.

In an assembled state, an outer surface of the shroud section 450 of the insert 402 (e.g., an outer surface at least between the lower edge 451 and the upper edge 453 of the shroud section 450) defines an annular clearance or passage dimension of the internal passage 455 with respect to a surface of the recess of the compressor housing shell 442, for example, to define a substantially annular portion of the recess having an axial length that extends from at least the outlet of the shroud port 445 to at least the inlet of the recirculation port 475. In the example of FIG. 4, above the recirculation port 475, an outer surface of the noise suppressor section 470 of the insert 402 defines in part a portion of the internal passage 455, for example, with respect to a lower surface of an annular radially inwardly and then axially downwardly extending protrusion of the insert 402. As an example, the portion of the noise suppressor section 470 may be angled, for example, to direct flow in a more axial direction toward a compressor wheel space upon exiting the recirculation port 475 as well as to direct flow from the opening 441 more centrally toward a compressor wheel space. As shown in the example of FIG. 4, the portion of the noise suppressor section 470 may include a lower, outer surface disposed at one angle and an upper, inner surface disposed at another angle where the two surfaces meet at the edge 473 of the noise suppressor section 470.

As an example, during manufacture, assembly, etc., the recess of the compressor housing shell 442 (e.g., which, in part, forms the internal passage 455) may be readily inspected, cleaned, surface imperfections remedied, etc. prior to positioning of the insert 402. As an example, the insert 402 may be removable, for example, for purposes of inspection, remedial action, etc. As an example, where disassembly is desired that includes removal of the compressor wheel 244, the insert 402 may be optionally removed from the compressor housing shell 442 to gain more space to access the compressor wheel 244, a nut attached to the shaft 220, etc. Further, with the insert 402 removed, if a tool accidently contacts the compressor housing shell 442, it may do so at a surface of the recess rather than a surface of the insert 402 that is along a direct flow path to the compressor wheel 244. Yet further, for balancing operations, a balancing process may optionally be performed on an assembly that includes the compressor housing shell 442 without the insert 402 in place. In such an example, a balancing machine component, tool, etc. may have more room to access the nose of the compressor wheel 244 (e.g., whether the nose of a partial bore compressor wheel or a nut fixed to a shaft upon which a compressor wheel is mounted).

As an example, the shroud section 450 of the insert 402 may have an angled surface that extends axially upward and radially outward from the lower edge 451. As an example, the compressor housing shell 442 may include an angled surface that extends axially upward and radially outward from the upper edge 443. In an assembled state, where the insert 402 is coupled to the compressor housing shell 442, an annular passage may be formed between such angled surfaces, for example, through which intake air may flow to the internal passage 455 and then to the one or more openings of the recirculation port 475 (e.g., or vice versa depending on pressures, etc.). As an example, the aforementioned bridges 457-1, 457-2, 457-N may be configured to not directly interfere with flow through the shroud port 445 (e.g., by limitation of length, etc.). In other words, the shroud port 445 may be clear of obstructions as to flow from the compressor wheel space to the internal passage 455. For example, a bridge may include a lower end that extends into the internal passage 455 (e.g. an internal recirculation passage) to an axial position ($z_{Bl}$) below an axial position of the recirculation port ($z_{rp}$) and above the axial position ($z_p$) of the shroud port. As an example, the bridge may include an upper that extends to an axial position ($z_{Bu}$) that is above the axial position ($z_{rp}$) of the recirculation port 475 and proximate to an axial position ($z_S$) of a seat formed in the wall 447 of the compressor housing shell 442.

As shown in the example of FIG. 4, the insert 402 may be axially located with respect to the compressor housing shell 442 by a shoulder 477 of the noise suppressor section 470 of the insert 402 seating against the seat (e.g., an axial stop) formed in the wall 447 of the compressor housing shell 442, for example, where the seat may include an annular face (e.g., a ridge, etc.) that extends radially inwardly from an inner surface of the wall 447 of the compressor housing shell 442 at the axial position ($z_s$).

In the example of FIG. 4, the axial location of the lower edge 451 of the shroud section 450 of the insert 402 with respect to the edge 443 of the compressor housing shell 442 determines, at least in part, the shape of the shroud port 445. For example, the axial location may determine an axial dimension of the shroud port 445. As an example, a spacer component 409 may be provided, for example, to adjust the shape of the shroud port 445 where the spacer component 409 may be disposed between the shoulder 477 of the insert 402 and the seat of the wall 447. While a particular thickness (e.g., axial height) is shown for the spacer component 409, another spacer or multiple spacers may be implemented, for example, to achieve a desired shroud port 445 shape (e.g., an axial dimension of the shroud port 445). In such an example, the spacer may be located where it is not subject to or interfering with recirculation flow (e.g., at a location outside of the internal passage 455).

As an example, the shoulder 477 of the noise suppressor section 470 of the insert 402 may include an annular face that contacts an annular face of the seat of the wall 447 of the compressor housing shell 442. In such an example, these faces may act to seal the internal passage 455, for example, such that flow is via the shroud port 445 and the recirculation port 475.

As an example, a coupling mechanism may be provided for adjustment of a shroud port. For example, the insert 402 may include features (e.g., threads, a bayonet, etc.) that cooperate with features of the compressor housing shell 442 where the insert 402 may be positioned axially via such features, for example, to set a desired spacing between the lower edge 451 of the shroud section 450 of the insert 402 and the edge 443 of the compressor housing shell 442.

Figure 5:
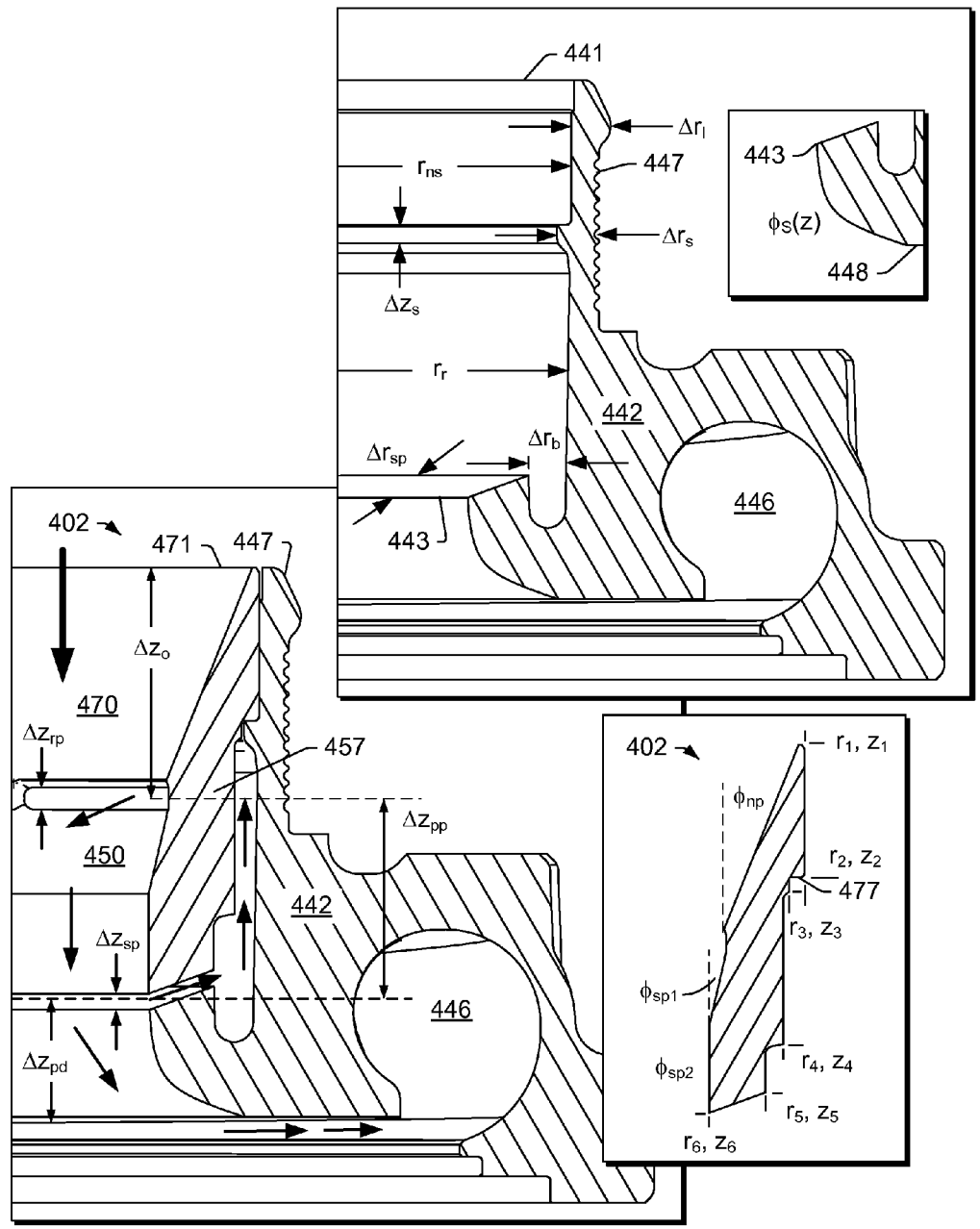
FIG. 5 is a series of cut-away views of components of the assembly of FIG. 4.

FIG. 5 shows a cut-away view of a portion the compressor housing shell 442 and another cut-away view of a portion of the insert 402 and the compressor housing shell 442 of FIG. 4 along with arrows to indicate examples of flow paths.

As shown in FIG. 5, the compressor housing shell 442 may be defined with respect to a cylindrical coordinate system (e.g., r, z, Θ coordinates). As indicated an outer lip of the wall 447 may be defined by an annular dimension $\Delta r_l$, an inner seat of the wall 447 may be defined by an annular dimension $\Delta r_s$ and an axial dimension $\Delta z_s$, a noise compressor portion of the wall 447 may be defined by a radius $r_{ns}$, a recess portion of the compressor housing shell 442 may be defined by a radius $r_r$, a bottom of the recess of the compressor housing shell 442 may be defined by an annular dimension $\Delta r_b$ and a shroud port surface of the compressor housing shell 442 may be defined by an annular dimension $\Delta r_{sp}$. As shown in the example of FIG. 5, the recess radius $r_r$ may decrease moving in an axial direction toward the bottom of the recess. However, as shown, the surface of the wall 447 may be relatively smooth, for example, without features that may interrupt or otherwise disturb flow within the internal passage 455 formed upon assembly of the insert 402 and the compressor housing shell 442. Such an approach may act to "capture" as much flow as possible for purposes of recirculation, which may, in turn, provide for reduced risk of surge.

As shown in an inset cross-sectional view of a portion of the compressor housing shell 442, a shroud wall may be defined by an angle $\phi_s(z)$, which varies in an axial direction from the edge 443 of the compressor housing shell to the diffuser surface 448 of the compressor housing shell 442.

The assembled view of FIG. 5 also shows various axial dimensions, including an opening to recirculation port dimension $\Delta z_o$, a recirculation port dimension $\Delta z_{rp}$, a shroud port dimension $\Delta z_{sp}$, a recirculation port to shroud port dimension $\Delta z_{pp}$, and a shroud port to diffuser dimension $\Delta z_{pd}$. In the example of FIG. 5, an inset cross-sectional view of the insert 402 shows various angles, including a noise suppressor section angle $\phi_{np}$, a first shroud section angle $\phi_{sp1}$ and a second shroud section angle $\phi_{sp2}$. The inset cross-sectional view of the insert 402 also shows various dimensions ($r_1$, $z_1$; $r_2$, $z_2$; $r_3$, $z_3$; $r_4$, $z_4$; $r_5$, $z_5$; and $r_6$, $z_6$). As shown, from an upper outer point ($r_1$, $z_1$) to a lower outer point ($r_5$, $z_5$), the outer surface of the insert 402 has decreasing radius (e.g., decreasing diameter), for example, at steps or transition points. As an example, where the insert 402 is supported in the compressor housing shell 442 at or near the point ($r_2$, $z_2$) (e.g., by the shoulder 477 of the noise suppressor section 470 of the insert 402), below that point, the outer surface of the insert 402 has a lesser radius (e.g., less diameter). In such an example, the shroud portion 450 may be considered as "floating" as it is supported by the shoulder 477 of the noise suppressor section 470 and not in contact with the compressor housing shell 442. Fluid interactions that may impart forces to the shroud portion 450 may be transmitted to the noise suppressor section 450 via the bridges 457-1, 457-N, which may then, for example, be transmitted to the compressor housing shell 442 at and/or above the seat of the wall 447. As an example, a material may be positioned between the noise suppressor section 450 and the compressor housing shell 442, for example, to damp vibration (see, e.g., the spacer 409). In such a manner, contact between the insert 402 and the compressor housing shell 442 may be more readily isolated and, for example, optionally addressed via inclusion of an appropriately selected material(s), etc.

Figure 6:
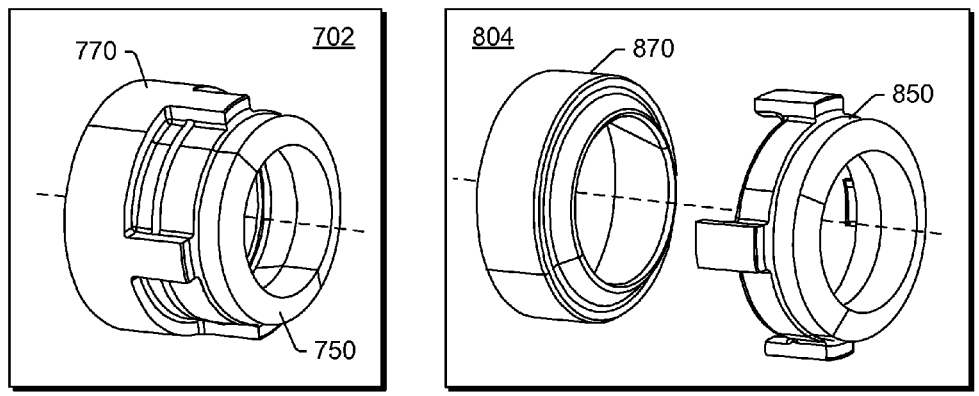
FIG. 6 is a series of views of perspective views of examples of components.
Figure 6:
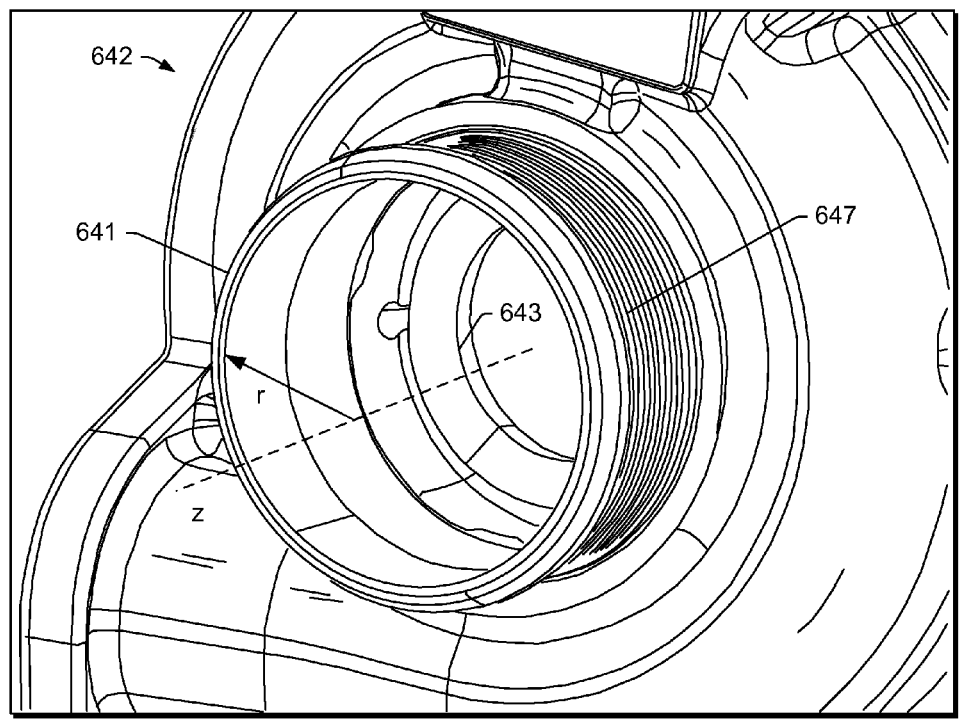

FIG. 6 shows perspective views of examples of various components. For example, FIG. 6 shows a compressor housing shell 642 that can receive an insert that may include features of an insert 702, an insert 804, etc. and be located in the compressor housing shell 642 by one or more features of a wall 647 of the compressor housing shell 642 (e.g., an axial stop formed by one or more features defined by a radius or radii "r" as measured from a z-axis). As an example, the wall 647 may be defined as extending from the end that defines an opening 641 to, for example, a bottom of a recess (see, e.g., an axial dimension $z_r$ in FIG. 4). Such a wall may include various features that may be defined, for example, with respect to a cylindrical coordinate system (e.g., r, z and Θ).

As an example, an insert may include a lower edge that may form an inlet opening of a shroud port with an upper edge 643 of the compressor housing shell 643. As an assembly, the insert and the compressor housing shell 642 may form an internal passage for recirculation flow from the shroud port to a recirculation port formed at least in part by the insert.

As an example, the insert 702 may be manufactured as, or otherwise provided as, a unitary component that includes a shroud section 750 and a noise suppressor section 770. For example, the insert 702 may be formed as a single piece or, for example, as separate pieces that are joined via a welding, bonding or other process. As to the insert 802, as an example, it may be provided as two separate components, for example, a shroud section component 850 and noise suppressor section component 870.

Figure 7:
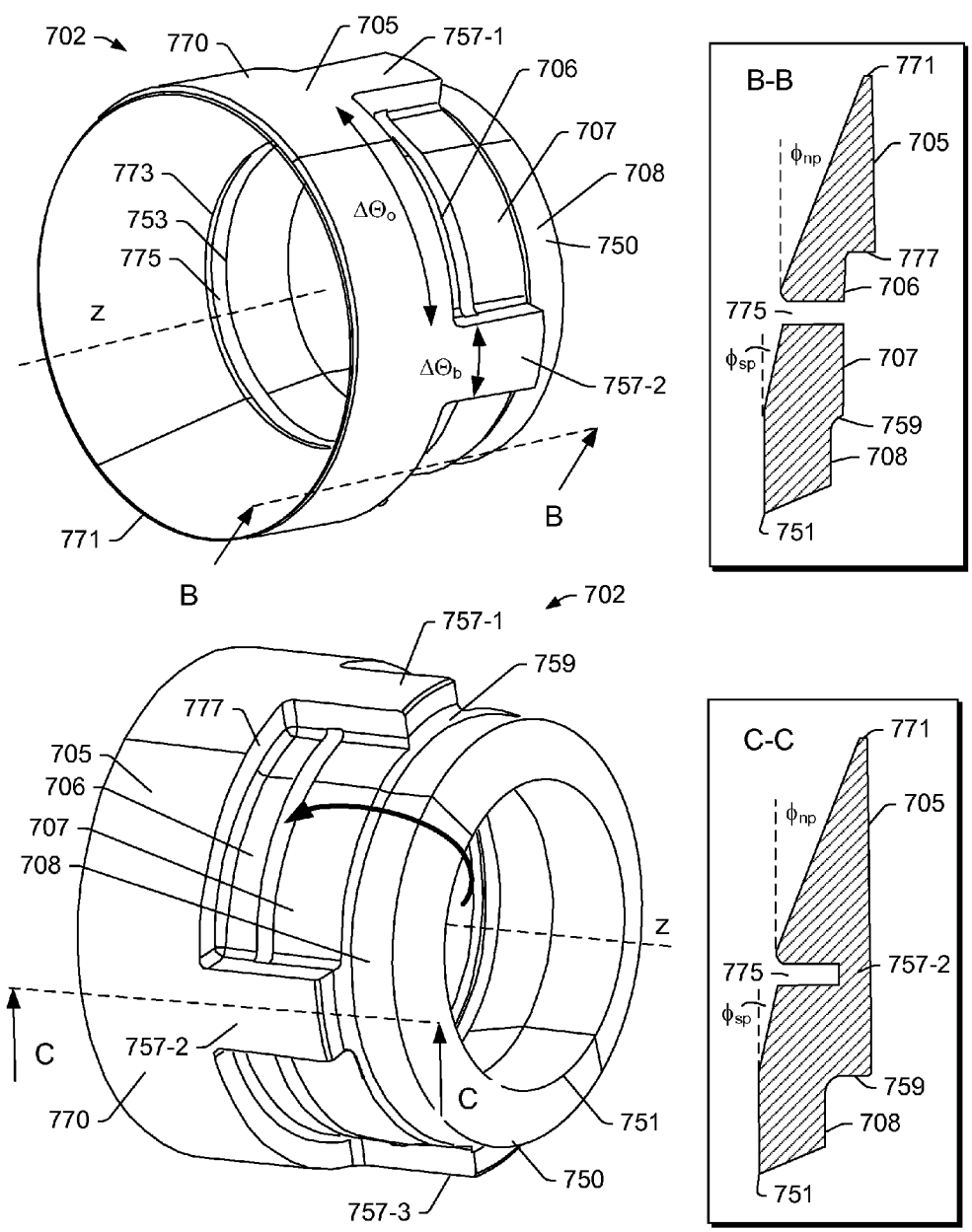
FIG. 7 is a series of perspective views of an example of an insert, a cross-sectional view along a line B-B and a cross-sectional view along a line C-C.

FIG. 7 shows two perspective views of the insert 702 along with a z-axis and an arrow to indicate a general direction of recirculation flow for the insert 702 together with a compressor housing such as in the assembly 600 of FIG. 6 as well as two cross-sectional views, one along a line B-B and the other along a line C-C. As shown in FIG. 7, the insert 702 may include a plurality of bridges 757-1, 757-2, 757-3 that bridge the shroud section 750 and the noise suppressor section 770 and provide for a recirculation port 775 defined in part by an inner upper edge 753 of the shroud section 750 and an inner lower edge 773 of the noise suppressor section 750. As an example, a bridge may be defined in part by an angle $\Delta\Theta_b$ and an opening of a recirculation port may be defined in part by an angle $\Delta\Theta_o$.

As shown in the example of FIG. 7, the bridges 757-1, 757-2, 757-3 extend from the noise suppressor section 770 axially downwardly toward the shroud section 750. Ends of the bridges 757-1, 757-2, 757-3 may be free in that they do not contact a compressor housing or that may contact a compressor housing, for example, to axially locate the insert 702 in a compressor housing (e.g., a compressor housing shell). As an example, the noise suppressor section 770 of the inset 702 may include a shoulder 777 that may be implemented to axially locate the insert 702 in a compressor housing. As an example, the shroud section 750 may include a shoulder 759 that may be implemented to axially locate the insert 702 in a compressor housing (e.g., via an axial stop or axial stops of a wall of a compressor housing). As an example, one or more ends of a bridge (e.g., or respective bridges) 757-1, 757-2, 757-3, etc. of the insert 702 may be implemented to axially locate the insert 702 in a compressor housing. As an example, one or more ends of a bridge and/or one or more shoulders may be implemented to axially locate an insert in a compressor housing, for example, to provide a desired clearance between a lower edge of the insert and an upper edge of the compressor housing that in combination define an inlet opening for a shroud port. For example, the shroud section 750 of the insert 702 includes a lower inner edge 751 that may define in part an inlet opening for a shroud port of a compressor housing assembly (see, e.g., the assembly 600 of FIG. 6). In the example of FIG. 7, the lowest edge of the insert 702 (e.g., along the z-axis) is the lower edge 751 of the shroud section 750.

In the example of FIG. 7, the insert 702 is shown as including outer surfaces 705, 706, 707 and 708 that may be described, for example, with respect to a cylindrical coordinate system (e.g., r, z and $\Theta$). The outer surface 705 may extend axially downwardly from the noise suppressor section 770 to bridges 757-1, 757-2, 757-3, etc. and may, for example, be a contact surface for contacting an inner surface of a wall of a compressor housing (see, e.g., the housing 842 of FIG. 8). As shown, the surface 706 extends axially downwardly from the shoulder 777 to the recirculation port 775 (see, e.g., cross-section along the line B-B) while the surface 707 extends axially downwardly from the recirculation port 775 to the shoulder 759, which may be at or proximate to lower ends of the bridges 757-1, 757-2, 757-3, etc. The surface 708 extends axially downwardly from the shoulder 759 to an outer edge of a surface that extends radially inwardly at an angle to the lower inner edge 751.

In the example of FIG. 7, the outer surface of the insert 702 has decreasing radius (e.g., decreasing diameter) from an upper outer point to a lower outer point, for example, at steps or transition points (e.g., at the shoulders 777 and 759). As an example, from the shoulder 759 downward to the inner edge 751, the insert 702 may be "floating" when positioned with respect to a recess of a compressor housing (see, e.g., the housing 842 of FIG. 8). Such an approach may form a clear portion of an internal passage (e.g., free of obstructions below lower ends of bridges), which may reduce losses (e.g., energy, momentum, etc.).

As an example, an insert such as the insert 702 may be described as including tubular sections connected by extensions, for example, to define an axial dimension of a recirculation port. For example, the noise suppressor section 770 may include the bridges 757-1, 757-2, 757-3, etc. as extensions that connect the noise suppressor section 770 and a shroud section 750.

As an example, the lower edge 773 of the noise suppressor section 770 may overhang the upper edge 753 of the shroud section 750 (see, e.g., cross-sectional views). In such an example, as flow emerges from the recirculation port 775, it may meet with flow from the noise suppressor section 770 that tails off the lower edge 773 (e.g., which may be an annular edge, optionally with a radius or smoothed contour). Such an approach may facilitate entrainment of recirculation air emerging from the recirculation port. As an example, an inner surface of the noise suppressor section 770 may be disposed at an angle ($\phi_{np}$) and an inner surface of the shroud section 750 may be disposed at an angle ($\phi_{sp}$). As an example, such angles may be approximately equal or, for example, within about 10 degrees.

Figure 8:
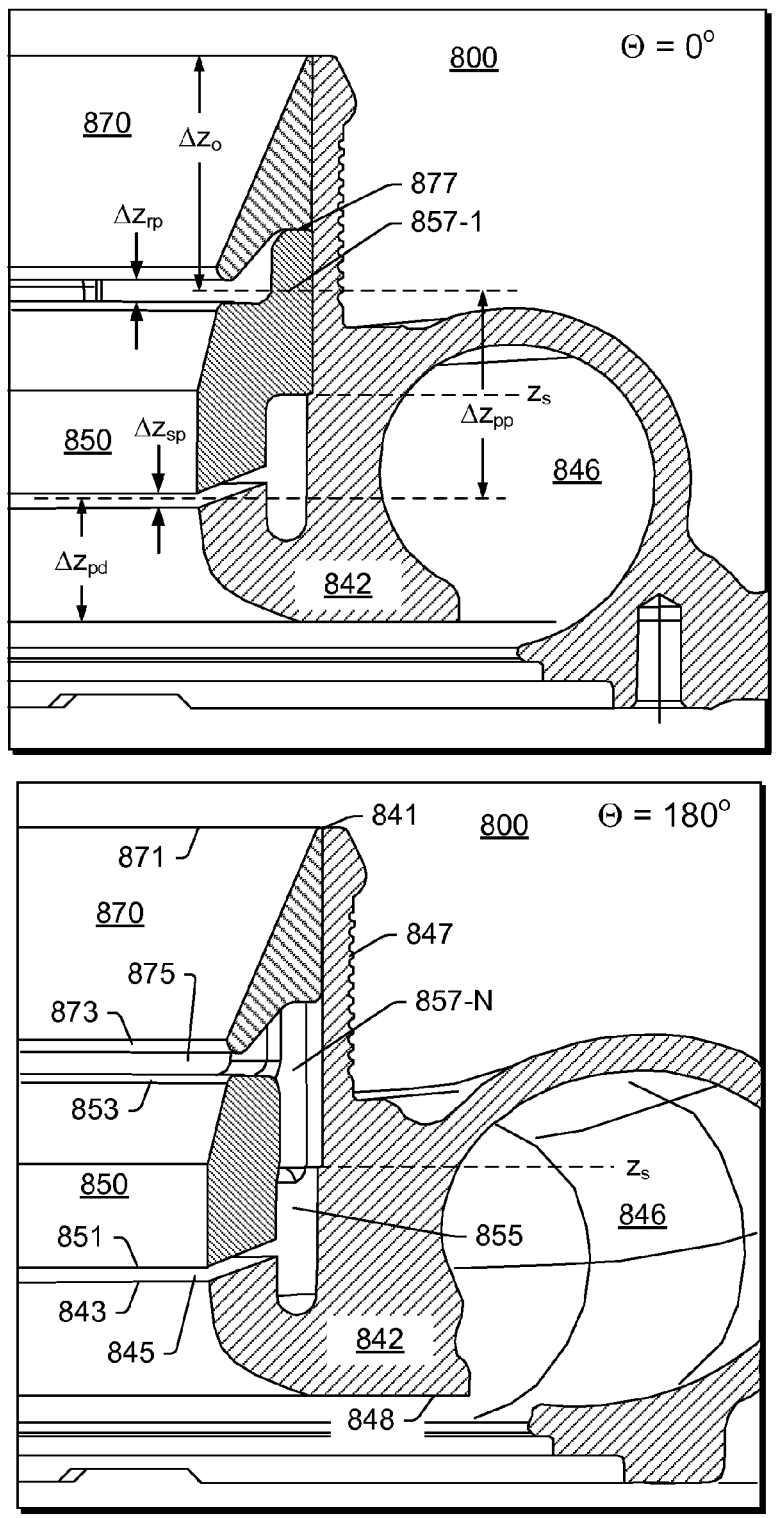
FIG. 8 is a series of cut-away views of an example of an assembly that includes a multi-component insert.

FIG. 8 shows two cut-away views of an assembly 800 with the insert 804 in a compressor housing shell 842, for example, with respect to a volute 846 of the compressor housing shell 842 at about 0 degrees and at about 180 degrees (e.g., at a larger volute cross-section). Various dimensions are shown in the views of FIG. 8, which may, for example, be referenced to a cylindrical coordinate system (e.g., r, z and $\Theta$). As shown, the dimensions include an opening to recirculation port dimension $\Delta z_o$, a recirculation port dimension $\Delta z_{rp}$, a shroud port dimension $\Delta z_{sp}$, a recirculation port to shroud port dimension $\Delta z_{pp}$, and a shroud port to diffuser dimension $\Delta z_{pd}$ (see, e.g., a diffuser surface 848 of the compressor housing shell 842). As an example, a wall 847 of the compressor housing shell 842 may be defined as extending from the end that defines an opening 841 to, for example, a bottom of a recess (see, e.g., an axial dimension $z_r$ in FIG. 4).

As an example, a recess of a compressor housing shell may be configured for ease of inspection, ease of polishing, etc. For example, the compressor housing shell 842 includes a recess defined in part by an inner surface of the wall 847 that may be accessed by a polishing tool, a deburring tool, etc. In particular, the inner surface may be relatively cylindrical, for example, to accommodate a cylindrical polishing head of a polishing tool. As an example, a seat (e.g., an axial stop) may be formed in the wall 847 by a bit of a machining tool (e.g., inserted via the opening 841). As the seat may be positioned some axial distance above the edge 843 of the compressor housing shell 842 (see, e.g., $z_S$), a risk of contacting or damaging the edge 843 (or surface extending therefrom) may be reduced.

In the example of FIG. 8, the insert 804 includes separate shroud section and noise suppressor section components 850 and 870. In such an example, the compressor housing shell 842 can include an axial face or other locating feature for axially locating the shroud section component 850, which, in turn, may provide a surface or surfaces for axially locating the noise suppressor section component 870. For example, in both views of FIG. 8, a shoulder (e.g., an axial stop) having an axial location $z_s$ is shown that may seat the shroud section component 850 via lower ends of bridges 857-1, 857-N of the shroud section component 850 contacting the shoulder of the compressor housing shell 842. As an example, the compressor housing shell 842 of FIG. 8 may be configured for receipt of the insert 702, for example, where the shoulder seat lower ends of the bridges 757-1, 757-N.

As an example, the compressor housing shell 842 may provide for axial stacking of the shroud section component 850 and the noise suppressor section component 870. In such an example, one or more spacers (see, e.g., the spacer 409 of FIG. 4) may be provided to tailor an axial dimension of a shroud port 845 between an upper edge 843 of the compressor housing shell 842 and a lower edge 851 of the shroud section component 850 and/or an axial dimension of a recirculation port 875 between an upper edge 853 of the shroud section component 850 and a lower edge 873 of the noise suppressor component 870. In the example of FIG. 8, the lowest edge of the insert 804 (e.g., along the z-axis) is the lower edge 851 of the shroud section component 851.

As an example, the shroud section component 850 may include a plurality of bridges 857-1, 857-N where upwardly facing axial ends of the bridges 857-1, 857-N may directly or indirectly axially locate the noise suppressor section component 870. As an example, the noise suppressor section component 870 may include a shoulder 877 that may directly or indirectly contact the upwardly facing axial ends of the bridges 857-1, 857-N. As to indirect contact, as an example, one or more spacers may be disposed between the components 850 and 870, for example, to achieve a desired port shape (e.g., $\Delta z_{rp}$), to form a seal, to isolate vibration, etc.

As an example, a shroud section of an insert (e.g., whether integral or a shroud section component) may be axially located by a locating mechanism. As an example, a locating mechanism may include a feature or features of a wall of a compressor housing shell, for example, a feature or features on an inner surface of the wall. As an example, a locating mechanism may be an interference fit mechanism where an interference fit is achieved between an outer surface of an insert (e.g., or component thereof) and an inner surface of a wall of a compressor housing shell. As mentioned with respect to the example compressor housing shell 442, as shown in FIG. 5, a recess radius may diminish. As an example, such a compressor housing shell may be configured to locate the insert 702 or a shroud section component 850 of the insert 804 via an interference fit, for example, where a depth of the fit defines an axial dimension of a shroud port formed at least in part by a lowermost edge of the insert 702 or the shroud section component 850 and an upper edge of the compressor housing shell (e.g., consider the upper edge 443 as a terminal edge of a shroud contour of a compressor wheel shroud portion of the shell 442).

Figure 9:
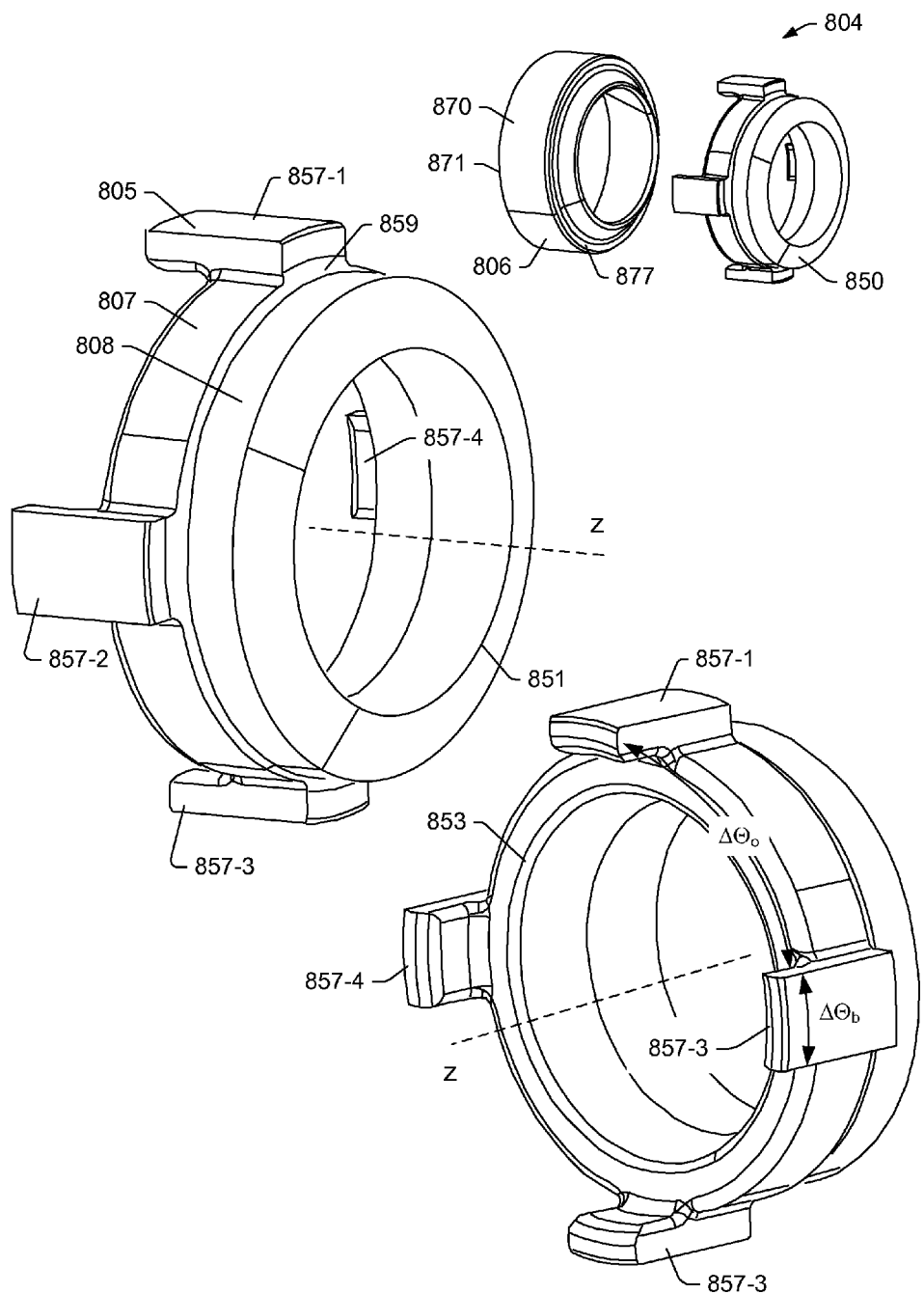
FIG. 9 is a series of perspective views of the insert of FIG. 8.

FIG. 9 shows an exploded, perspective view of the insert 804 and two perspective views of the shroud section component 870, including lower ends and upper ends of four bridges 857-1, 857-2, 857-3 and 857-4 (e.g., noting that a different number of bridges may be provided). As an example, a bridge may be defined in part by an angle $\Delta\Theta_b$ and an opening of a recirculation port may be defined in part by an angle $\Delta\Theta_o$ (e.g., a spacing between neighboring bridges).

In the example of FIG. 9, the insert 804 is shown as including outer surfaces 805, 806, 807 and 808 that may be described, for example, with respect to a cylindrical coordinate system (e.g., r, z and $\Theta$). The outer surface 805 may extend axially a length of a bridge 857-1, 857-2, 857-3, 857-4 and may, for example, be a contact surface for contacting an inner surface of a wall of a compressor housing (see, e.g., the housing 842 of FIG. 8). As shown, the surface 806 extends axially downwardly from the edge 871 to the shoulder 877 of the noise suppressor section component 870 and the surface 807 extends axially downwardly from the recirculation port 875 to a shoulder 859, which may be at or proximate to lower ends of the bridges 857-1, 857-2, 857-3, 857-4. The surface 808 extends axially downwardly from the shoulder 859 to an outer edge of a surface that extends radially inwardly at an angle to the lower inner edge 851. As an example, the angle may be to direct flow, in part, in an axial direction to the internal recirculation passage 855.

As mentioned, a lower end of a bridge may be provided for axially locating a shroud section component in a compressor housing while an upper end of a bridge may be provided for axially locating a noise suppressor section component in a compressor housing. Further, a distance between a lower end and an upper end of a bridge (e.g., an axial bridge length) may define, in part, an axial height of one or more openings of a recirculation port. Such a dimension may, in part, determine how much recirculation occurs, how recirculated air is "injected" into an intake air flow stream, etc. Such factors may influence surge, for example, where a surge line may be located on a compressor map. As an example, the shape, angle, etc., of a lower edge 851 or an upper edge 853 of the shroud section component 850 may have an influence on where a surge line is located on a compressor map (e.g., for an assembly that includes the shroud section component 850).

As an example, an assembly may include the shroud section component 850 without including the noise suppressor section component 870. For example, the noise suppressor section component 870 may be optional (e.g., for use in installations where noise reduction may be desirable). In such an example, the bridges 857-1, 857-N (e.g., where N is greater than 1) may aid in axially locating and stabilizing the shroud section component 850 in a compressor housing (e.g., without supporting a noise suppressor section component). In such an example, the recirculation port may be defined by openings between bridges, for example, where recirculation air flows axially upwardly in an internal passage 855 and then may be directed more radially under influence of incoming intake air.

Figure 10:
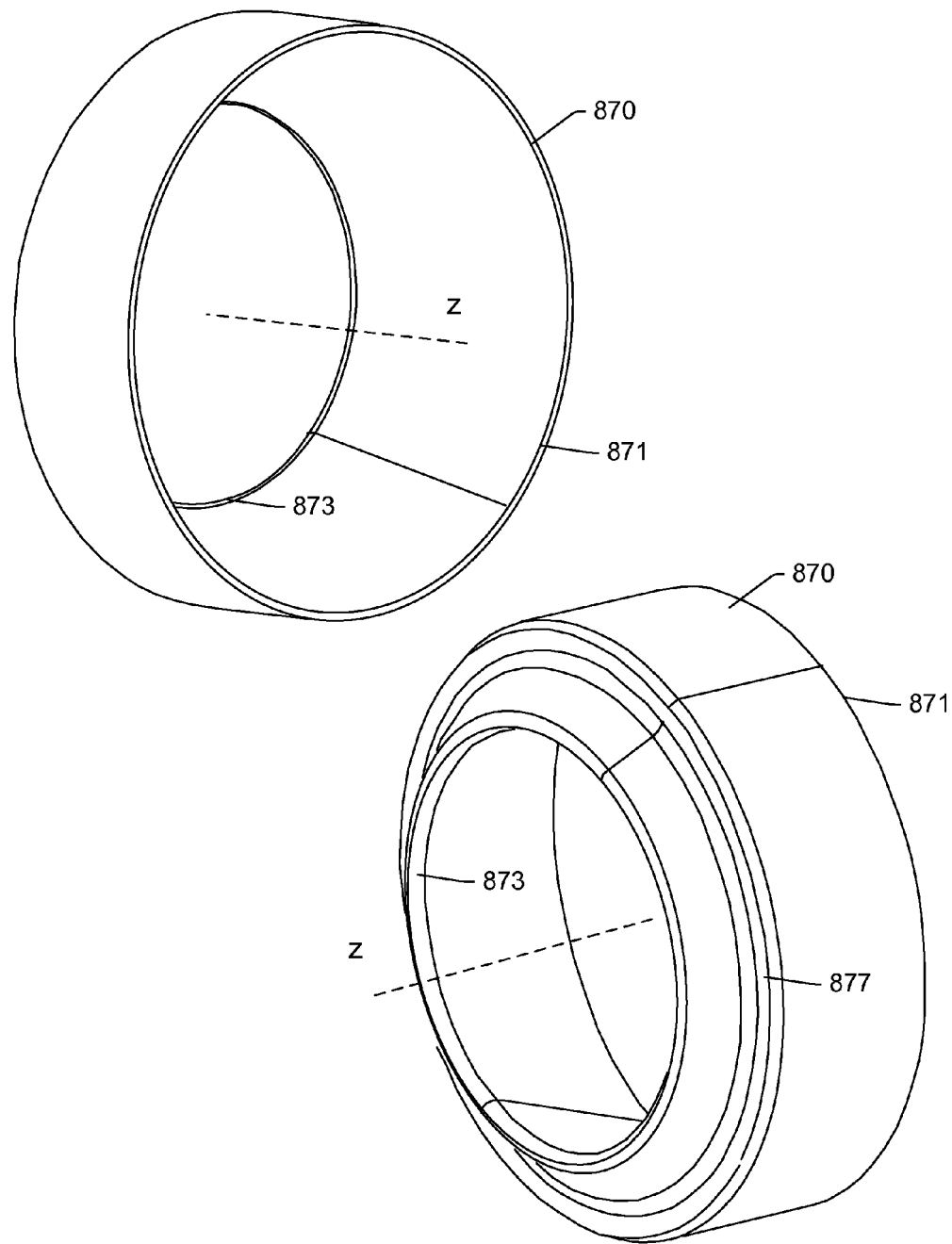
FIG. 10 is a series of perspective views of a noise suppressor section component that may be part of the insert of FIG. 8.

FIG. 10 shows two perspective views of the noise suppressor section component 870. As shown in the example of FIG. 10, the noise suppressor section component 870 includes the upper edge 871 that forms an upper opening, the lower edge 873 that may form, in part, a recirculation port in conjunction with another component, and the shoulder 877. As shown, the outer surface of the noise suppressor section component 870 is substantially cylindrical from the upper edge 871 to the shoulder 877 and then slopes radially inwardly respect to an axial direction towards the lower edge 873. As mentioned, the shape of a noise suppressor section of an insert (e.g., as a component or an integral section) may define in part an internal passage between the insert and a compressor housing in which recirculation air flows. The shape may help direct recirculation air to one or more openings of a recirculation port, for example, in a direction toward a compressor wheel space (e.g., in the same general direction as incoming intake air).

As an example, a selection of components may be provided and available for assembling a turbocharger. For example, a given noise suppressor section component may be provided and matched with one of several shroud section components. In such an example, the several shroud section components may include dimensions that are tailored to particular applications. For example, one may be configured with dimensions for an application that may often encounter low mass flow (e.g., consider axial position of a lower edge that forms a shroud port, an outer surface that defines in part an internal recirculation passage, etc.). Such dimensions may define cross-sectional areas, volumes, etc. that can tailor flow, for example, flow germane to surge (e.g., to achieve a desired amount of surge reduction, etc.).

As an example, a compressor housing assembly for a turbocharger can include a compressor housing shell (see, e.g., 442, 642, 842) that includes an axis (e.g., z-axis) for alignment with a rotational axis of a compressor wheel, a wall (see, e.g., 447, 647, 847) that includes features defined in part by radii with respect to the axis, and an edge (see, e.g., 443, 643, 843) that may define in part an inlet opening of a shroud port (445, 845); and an insert (see, e.g., 402, 702, 804) that includes a shroud section (see, e.g., 450, 750, 850) and a noise suppressor section (see, e.g., 470, 770, 870) that define a recirculation port (see, e.g., 475, 775, 875) where the insert (see, e.g., 402, 702, 804) may be axially located by the wall (see, e.g., 447, 647, 847) of the compressor housing shell (see, e.g., 442, 642, 842), where an internal recirculation passage (see, e.g., 455, 855) may be defined in part by the insert (see, e.g., 402, 702, 804) and the wall (see, e.g., 447, 647, 847), and where an edge (see, e.g., 451, 771, 871) of the shroud section (see, e.g., 450, 750, 850) may define in part the inlet opening of the shroud port (see, e.g., 445, 845). In such an example, the insert may include a shroud section component and a noise suppressor section component (e.g., as separate components).

As an example, a lower edge of a shroud section may be the lowermost edge of an insert (e.g., or a shroud section component). As an example, a portion of a shroud section may be describes as "floating", for example where an annular clearance exists between an outer surface of the shroud section and an inner surface of a wall of a compressor housing shell. In such an example, the annular clearance may provide for unimpeded flow within at least a portion of an internal passage (e.g., an internal recirculation passage). As an example, another portion of an internal passage may be impeded in part by one or more bridges or extensions. In such an example, the internal passage may extend in spaces between bridges to a recirculation port. As an example, an insert or component thereof may include several bridges (e.g., from about 2 bridges to about 6 bridges). As an example, an insert or component thereof may include 3 bridges or, for example, 4 bridges where each bridge may be defined in part by an azimuthal span and an axial length (e.g., with a span between an upper point and a lower point).

As an example, an insert may include at least one bridge that bridges the noise suppressor section to the shroud section. For example, such at least one bridge may define an axial dimension of an inlet opening of a recirculation port between the noise suppressor section and the shroud section. As an example, a bridge may be an extension, for example, that extends outwardly from a component or between two sections of a component, etc.

As an example, an insert may include a shoulder and a wall of a compressor housing shell may include a seat that seats the shoulder to axially locate the insert with respect to the compressor housing shell. While a shoulder and seat are mentioned, one or more other features may be provided as a locating mechanism or locating mechanisms to locate such components.

As an example, a compressor housing assembly can include a shroud section component that includes at least one bridge that includes a lower axial end and can include a compressor housing shell that includes a seat that seats the lower axial end of the at least one bridge to axially locate the shroud section component with respect to the compressor housing shell. In such an example, a noise suppressor section component may include a shoulder where at least one bridge of the shroud section component may include an upper end that seats the shoulder of the noise suppressor section component to axially locate the noise suppressor section component with respect to the shroud section component. In such an example, the axial location of the noise suppressor section component with respect to the shroud section component may define an axial dimension of an outlet opening of a recirculation port.

As an example, a compressor housing assembly may include a noise suppressor section that includes an upper edge, a lower edge and an angled inner surface that extends from an upper diameter at the upper edge to a lower diameter at the lower edge where the upper diameter exceeds the lower diameter.

As an example, a compressor housing assembly may include at least one bridge that extends between an axial position above a lower edge of a noise suppressor section to an axial position below an upper edge of a shroud section, for example, where the noise suppressor section and the shroud section may optionally be provided by separate components. In such an example, a radial clearance may exist between an outer surface of the at least one bridge and an inner surface of the compressor housing shell at a location within an internal recirculation passage. As an example, an outer surface of at least one bridge and an inner surface of a compressor housing shell may contact at a location within an internal recirculation passage. In such an example, the contact may axially locate at least a shroud section of an insert (e.g., where the insert may optionally include a noise suppressor section component and a shroud section component).

As an example, a compressor housing assembly may include a shroud section component that includes at least one extension that extends axially upward and that forms a seat that seats a noise suppressor section component.

As an example, a compressor housing assembly may include at least one spacer. In such an example, an insert may include a shroud section component and a noise suppressor section component where at least one of the at least one spacer axially spaces the noise suppressor section component with respect to the shroud section component. As an example, at least one spacer may disposed in an assembly between an insert and a compressor housing shell to define an axial dimension of an inlet opening of a shroud port.

As an example, a method can include providing a compressor housing shell that includes an axis for alignment with a rotational axis of a compressor wheel, a wall that includes features defined in part by radii with respect to the axis, and an edge that defines in part an inlet opening of a shroud port; providing an insert that includes a shroud section and a noise suppressor section that define a recirculation port; and axially locating the insert via the wall of the compressor housing shell to define an internal recirculation passage in part by the insert and the wall, and to define an inlet opening of the shroud port in part by an edge of the shroud section. Such a method may include assembling a turbocharger that includes the compressor housing shell and the insert. As an example, a method may further include operating the turbocharger with reduced surge. For example, the assembled turbocharger may have a wider compressor map (e.g., with respect to a surge limit) when compared to a turbocharger without the compressor housing shell and insert.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A compressor housing assembly for a turbocharger comprising:
   a compressor housing shell that comprises an axis for alignment with a rotational axis of a compressor wheel, a wall that comprises a seat defined in part by radii with respect to the axis, and an edge that defines in part an inlet opening of a shroud port; and
   an insert that comprises a shroud section and a noise suppressor section that define a recirculation port wherein the insert is axially located by a shoulder of the noise suppressor section and the seat of the wall of the compressor housing shell such that the shroud section does not contact the wall of the compressor housing shell, wherein an internal recirculation passage is defined in part by the insert and the wall, wherein a lower edge of the shroud section defines in part the inlet opening of the shroud port and wherein the lower edge is axially the lowermost edge of the insert.

2. The compressor housing assembly of claim 1 wherein the insert comprises at least one bridge that bridges the noise suppressor section to the shroud section.

3. The compressor housing assembly of claim 2 wherein the at least one bridge defines an axial dimension of an inlet opening of the recirculation port between the noise suppressor section and the shroud section.

4. The compressor housing assembly of claim 1 wherein the noise suppressor section comprises an upper edge, a lower edge and an angled inner surface that extends from an upper diameter at the upper edge to a lower diameter at the lower edge wherein the upper diameter exceeds the lower diameter.

5. The compressor housing assembly of claim 1 wherein at least one bridge extends between an axial position above a lower edge of the noise suppressor section to an axial position below an upper edge of the shroud section.

6. The compressor housing assembly of claim 5 wherein a radial clearance exists between an outer surface of the at least one bridge and an inner surface of the compressor housing shell at a location within the internal recirculation passage.

7. The compressor housing assembly of claim 1 comprising at least one spacer.

8. The compressor housing assembly of claim 7 wherein at least one of the at least one spacer is disposed between the insert and the compressor housing shell to define an axial dimension of an inlet opening of the shroud port.

9. A method comprising:
   providing a compressor housing shell that comprises an axis for alignment with a rotational axis of a compressor wheel, a wall that comprises a seat defined in part by radii with respect to the axis, and an edge that defines in part an inlet opening of a shroud port;
   providing an insert that comprises a shroud section and a noise suppressor section that define a recirculation port; and
   axially locating the insert via a shoulder of the noise suppressor section and the seat of the wall of the compressor housing shell, such that the shroud section does not contact the wall of the compressor housing shell, to define an internal recirculation passage in part by the insert and the wall, and to define an inlet opening of the shroud port in part by an edge of the shroud section.

10. The method of claim 9 further comprising assembling a turbocharger that comprises the compressor housing shell and the insert.

* * * * *